(12) United States Patent
Nishinaka et al.

(10) Patent No.: US 7,999,476 B2
(45) Date of Patent: Aug. 16, 2011

(54) PLASMA DISPLAY SEALING STRUCTURE

(75) Inventors: Masaki Nishinaka, Osaka (JP);
Akinobu Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 292 days.

(21) Appl. No.: 11/814,204

(22) PCT Filed: Feb. 26, 2007

(86) PCT No.: PCT/JP2007/053471
§ 371 (c)(1),
(2), (4) Date: Jul. 18, 2007

(87) PCT Pub. No.: WO2007/099890
PCT Pub. Date: Sep. 7, 2007

(65) Prior Publication Data
US 2010/0060166 A1 Mar. 11, 2010

(30) Foreign Application Priority Data
Feb. 28, 2006 (JP) .................................. 2006-051744

(51) Int. Cl.
*H01J 61/30* (2006.01)
*H01J 9/26* (2006.01)
(52) U.S. Cl. .......... 313/634; 313/581; 313/587; 445/24; 445/25
(58) Field of Classification Search .......... 313/581–587; 445/24–25
See application file for complete search history.

(56) References Cited

U.S. PATENT DOCUMENTS

| 5,252,521 | A | * | 10/1993 | Roberts | 501/17 |
| 5,350,718 | A | * | 9/1994 | Anquetil et al. | 501/21 |
| 5,491,118 | A | * | 2/1996 | Hormadaly | 501/20 |
| 6,362,119 | B1 | * | 3/2002 | Chiba | 501/15 |
| 6,840,833 | B1 | * | 1/2005 | Motowaki et al. | 445/25 |
| 2005/0151475 | A1 | * | 7/2005 | Sasaki et al. | 313/582 |
| 2006/0003883 | A1 | * | 1/2006 | Yoshida et al. | 501/46 |
| 2006/0008607 | A1 | | 1/2006 | Fujimoto et al. | |

(Continued)

FOREIGN PATENT DOCUMENTS
JP 11-314936 11/1999
(Continued)

OTHER PUBLICATIONS

Suzuki et al., Korean Patent application publication 2005-0092403, Jul. 2005, machine translation.*

(Continued)

*Primary Examiner* — Anne Hines
*Assistant Examiner* — Tracie Green
(74) *Attorney, Agent, or Firm* — Pearne & Gordon LLP

(57) ABSTRACT

There is provided a plasma display panel in which a front plate and a rear plate are disposed opposite to each other, a side of a tubular exhaust pipe is disposed in the vicinity of a fine hole provided in the rear plate using a tablet serving as sealant formed of frit glass, peripheries of the front plate and the rear plate and the exhaust pipe are sealed with the sealant in order to form a discharge space, and the discharge space is ventilated and discharge gas is filled into the discharge space through the exhaust pipe. The rear plate and the exhaust pipe are sealed by a sealed part obtained by melting a tablet made of amorphous frit glass not containing lead, and a stress working on the sealed part is a tension in the direction of the rear plate and the direction of the exhaust pipe.

11 Claims, 5 Drawing Sheets

U.S. PATENT DOCUMENTS

2006/0105898 A1* 5/2006 Ide .................................. 501/50
2006/0154008 A1 7/2006 Suzuki et al.

FOREIGN PATENT DOCUMENTS

| JP | 2000-007373 | 1/2000 |
| JP | 2000-172196 | 6/2000 |
| JP | 2003-095697 | 4/2003 |
| JP | 2003-238199 | 8/2003 |
| JP | 2004-014332 | 1/2004 |
| JP | 2004-031118 | 1/2004 |
| JP | 2004-035316 | 2/2004 |
| JP | 2004-182584 | 7/2004 |
| JP | 2005-281125 | 10/2005 |
| JP | 2005281125 A | 10/2005 |
| WO | 2004064103 A1 | 7/2004 |

OTHER PUBLICATIONS

European Search Report for Appl. No. EP 07714903 dated Mar. 26, 2010.

* cited by examiner ns structure

TECHNICAL FIELD

The present invention relates to a plasma display panel (hereinafter, referred to as 'PDP') that is a flat display device used in a large-sized television, a public display, and the like.

BACKGROUND ART

As high resolution and large screen in a PDP are realized, a 65-inch television receiver or a large-sized public display device is being manufactured and a product larger than 100 inch is also planned. Particularly in the case of a PDP dedicated for a television receiver, application to full spec Hi-Vision, in which the number of scan lines is twice or more than that in the known NTSC system, is under progress.

Basically, a PDP is configured to include a front plate and a rear plate. The front panel is configured to include a glass substrate made of sodium borosilicate based glass using a float method, display electrodes including strip-shaped transparent electrodes and bus electrodes formed on a main surface of the glass substrate, a dielectric layer that covers the display electrodes and serves as a capacitor, and a protective layer that is formed on the dielectric layer and made of magnesium oxide (MgO). On the other hand, the rear plate is configured to include a glass substrate provided with a fine hole for ventilation and discharge gas filling, strip-shaped address electrodes formed on a main surface of the glass substrate, a base dielectric layer that covers the address electrodes, barrier ribs formed on the base dielectric layer, and a phosphor layer that is formed between the barrier ribs to emit light in red, green, and blue colors.

In addition, peripheries of the front plate and the rear plate are airtight sealed by sealant in a state in which surfaces, on which electrodes are formed, of the front plate and the rear plate are disposed opposite to each other. In addition, an exhaust pipe for ventilation and discharge gas filling is sealed on the rear plate with a sealing tablet and ventilation of a discharge space, which is divided into barrier ribs by the exhaust pipe, and filling of discharge gas (in the case of Ne—Xe, pressure of 53200 Pa to 79800 Pa) are performed. Here, the exhaust pipe is fused and sealed by locally heating and melting (chipping off) a proper place thereof.

As sealant used for sealing of the dielectric layer, peripheries of the front and rear plates, and the exhaust pipe, low-melting-point glass (also referred to as a 'frit glass') having lead oxide as a main component has been generally used. The frit glass includes amorphous frit glass that has an amorphous characteristic without being crystallized even if the glass is heated and crystallized frit glass that is crystallized by heating. In many cases, one of the two types of glass is selected in consideration of matching with a process of manufacturing a PDP.

Moreover, in consideration of an environmental issue in recent years, it is requested that a non-lead based material called 'lead free' or 'leadless' and not containing a lead component be used even for a PDP. Examples of bismuth oxide based sealant and phosphate based (for example, phosphate-tin oxide based) sealant not containing a lead component are disclosed (for example, refer to Patent Documents 1 and 2).

However, in the case of sealant having phosphate-tin oxide based low-melting-point glass as a main component that has been proposed as non-lead sealant, a resistance to water is weak as compared with lead oxide based sealant that has been used in the related art. Accordingly, there is a problem in that it is difficult to sufficiently maintain the airtight state of a PDP.

For this reason, bismuth oxide based sealant has been drawing attention as a non-lead material. In addition, in the case of the non-lead sealant having a bismuth oxide based frit glass as a main component, a softening point tends to be high after temporary baking, which is not seen in the known amorphous frit containing lead. Moreover, the leadless sealant having the bismuth oxide based frit glass as a main component is crystallized as the baking temperature increases.

In the relate art, the exhaust pipe has been formed of borosilicate based glass containing lead since a softening point temperature is relatively low and workability in a sealing process is excellent. However, due to an environmental issue, a trend is changing in the direction in which borosilicate based glass not containing lead is used.

FIG. 7 is a cross-sectional view illustrating the periphery of an exhaust pipe in a known PDP in which sealant or the exhaust pipe is formed of non-lead glass. As shown in FIG. 7, in PDP 50, front plate 52 and rear plate 53 are airtight sealed by sealant 54. Further, exhaust pipe 51 is airtight sealed by sealing tablet 55 having hole 33.

However, although leadless materials are used for rear plate 53, exhaust pipe 51, and sealing tablet 55, the non-lead materials have different physical characteristics. Among the physical characteristics, particularly in the case when coefficients of thermal expansion are different, ring-shaped distortion resulting from a stress occurs in sealed part 56 in which exhaust pipe 51 is sealed on rear plate 53. Accordingly, a problem occurs in that crack damage occurs or the airtight state deteriorates to cause leak failure.

In the case of non-lead sealant having bismuth oxide based frit glass as a main component, a softening point tends to be high after temporary baking. For this reason, it is necessary to set the temperature in sealing processing high. As the temperature in sealing processing increases, distortion resulting from a stress occurs noticeably, which also increases a failure frequency in a manufacturing process.

Moreover, even though it is easy to match characteristics, such as coefficients of thermal expansion of exhaust pipe 51 and the glass substrate used for rear plate 53 with each other, it is difficult to match a material for forming rear plate 53 or exhaust pipe 51 and characteristics, such as a coefficient of thermal expansion because the frit glass used for sealing tablet 55 is a low-melting-point glass.

Therefore, it is necessary to select frit glass and detect matching, and many tests are required to secure a processing condition for preventing damage or leak failure of a sealed part from occurring due to a difference of characteristics, such as coefficients of thermal expansion, by controlling the temperature, time, a heating rate, a cooling rate, and the like in consideration of characteristics.

[Patent Document 1] Japanese Patent Unexamined Publication No. 2004-182584
[Patent Document 2] Japanese Patent Unexamined Publication No. 2003-095697

DISCLOSURE OF THE INVENTION

According to an aspect of the invention, there is provided a plasma display panel in which a front plate and a rear plate are disposed opposite to each other, a side of a tubular exhaust pipe is disposed in the vicinity of a fine hole provided in the rear plate using a tablet serving as sealant formed of frit glass, peripheries of the front plate and the rear plate and the exhaust pipe are sealed with the sealant in order to form a discharge space, and the discharge space is ventilated and discharge gas is filled into the discharge space through the exhaust pipe. The rear plate and the exhaust pipe are sealed by a sealed part obtained by melting a tablet made of amorphous frit glass not containing lead, and a stress working on the sealed part is a tension in the direction of the rear plate and the direction of the exhaust pipe.

Thus, since an adjustment is made such that the tension works on the sealed part, the sealed part is not damaged by cracking or the airtight state of the sealed part does not deteriorate, and accordingly, the high reliability is secured. As a result, it is possible to realize a high-quality PDP in which an environmental problem is considered due to using a non-lead material.

Figure 1:
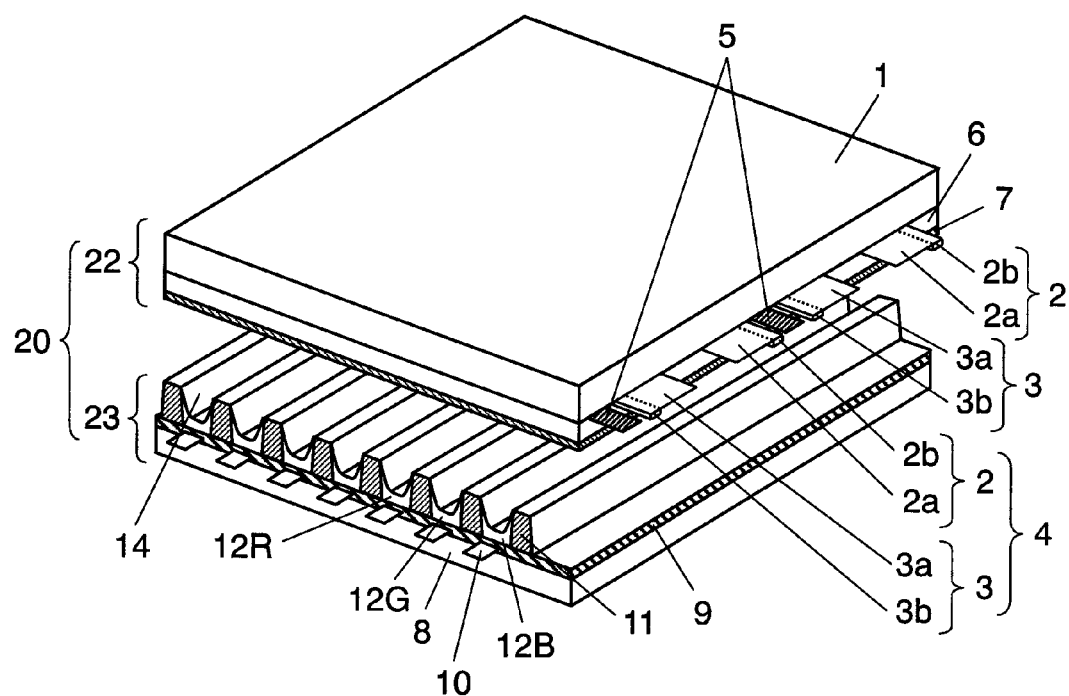
FIG. 1 is a perspective view illustrating the structure of a PDP according to an embodiment of the invention.

| DESCRIPTION OF REFERENCE NUMERALS AND SIGNS | |
|---|---|
| 1: | front glass substrate |
| 2: | scan electrode |
| 2a, 3a: | transparent electrode |
| 2b, 3b: | metal bus electrode |
| 3: | sustain electrode |
| 4: | display electrode |
| 5: | light shielding layer |
| 6: | dielectric layer |
| 7: | protective layer |
| 8: | rear glass substrate |
| 9: | base dielectric layer |
| 10: | address electrode |
| 11: | barrier rib |
| 12R, 12G, 12B: | phosphor layer |
| 14: | discharge space |
| 20: | PDP |
| 21: | exhaust pipe |
| 22: | front plate |
| 23: | rear plate |
| 30: | fine hole |
| 31, 31a, 31b: | sealant |
| 32: | tablet |
| 33: | hole |
| 35: | sealed part |
| 41: | exhaust pipe head |
| 42: | elastic unit |

PREFERRED EMBODIMENTS FOR CARRYING OUT THE INVENTION

Hereinafter, a PDP according to an embodiment of the invention will be described in detail with reference to the accompanying drawings.

FIG. 1 is a perspective view illustrating the structure of a PDP according to an embodiment of the invention. The basic structure of the PDP is the same as that of a general alternating-current surface discharge type PDP. As shown in FIG. 1, in PDP 20, front plate 22 having front glass substrate 1 and the like and rear plate 23 having rear glass substrate 8 and the like are disposed opposite to each other and peripheries of front plate 22 and rear plate 23 are airtight sealed by sealant, such as glass frit. In a discharge space 14 inside sealed PDP 20, discharge gas, such as neon (Ne) and xenon (Xe), is filled at a pressure of 53200 Pa to 79800 Pa.

On front glass substrate 1 of front plate 22, a plurality of strip-shaped display electrodes 4, each of which includes a pair of scan electrode 2 and sustain electrode 3, and a plurality of light shielding layers 5 are disposed parallel to each other. On front glass substrate 1, dielectric layer 6 serving as a capacitor is formed to cover display electrodes 4 and shielding layers 5 and then protective layer 7 made of, for example, magnesium oxide (MgO) is formed on dielectric layer 6.

Further, on rear glass substrate 8 of rear plate 23, a plurality of strip-shaped address electrodes 10 are disposed parallel to each other in the direction perpendicular to scan electrodes 2 and sustain electrodes 3 of front plate 22, and then base dielectric layer 9 covers address electrodes 10. Moreover, on base dielectric layer 9 between address electrodes 10, barrier ribs 11 that have a predetermined height and serve to divide discharge space 14 are formed. Phosphor layers 12R, 12G, and 12B that emit red, green, and blue colored light by ultraviolet rays, respectively, are sequentially applied and formed on grooves between barrier ribs 11 for every address electrode 10. Discharge cells are formed at the positions where scan electrode 2, sustain electrodes 3, and address electrodes 10 intersect. Discharge cells having red, green, and blue colored phosphor layers 12R, 12G, and 12B disposed to be parallel in the direction of display electrode 4 become pixels for color display.

Moreover, a method of manufacturing PDP 20 will be described. First, scan electrodes 2, sustain electrodes 3, and light shielding layer 5 are formed on front glass substrate 1. Transparent electrodes 2a and 3a and metal bus electrodes 2b and 3b that form scan electrodes 2 and sustain electrodes 3 are formed by patterning using a photolithographic method or the like. Transparent electrodes 2a and 3a are formed using a thin film process and the like, and metal bus electrodes 2b and 3b are formed by baking paste containing a silver material at the desired temperature and then solidifying the baked paste. In addition, similarly, light shielding layer 5 is also formed using a method of screen-printing a paste containing black pigment or by forming black pigment on the entire surface of the glass substrate, patterning the pigment using a photolithographic method, and then baking the patterned pigment.

Thereafter, dielectric paste is coated on front glass substrate 1 so as to cover scan electrodes 2, sustain electrodes 3, and light shielding layer 5 using a die coating method, for example, thereby forming a dielectric paste layer (dielectric material layer). By performing no processing for a predetermined period of time after coating the dielectric paste, a surface of the coated dielectric paste is leveled to become a flat surface. Then, dielectric layer 6 that covers scan electrodes 2, sustain electrodes 3, and shielding layer 5 is formed by baking and solidifying the dielectric paste layer. In addition, the dielectric paste is a coating material containing a dielectric material such as glass powder, a binder, and a solvent.

Then, protective layer 7 made of magnesium oxide (MgO) is formed on dielectric layer 6 using a vacuum deposition method. A predetermined structure (display electrodes 4 including scan electrodes 2 and sustain electrodes 3, light shielding layer 5, dielectric layer 6, and protective layer 7) is formed on front glass substrate 1 through the processes described above, and thus front plate 22 is completed. In addition, a material containing lead is not used for each of the constituent components of front plate 22 described above.

On the other hand, rear plate 23 is formed as follows. First, a material layer to become a structure for address electrodes 10 is formed on rear glass substrate 8 by using a method of screen-printing paste containing a silver material or a method in which a metal layer is formed on the entire surface and is then patterned using a photolithographic method, and then the material layer is baked at the predetermined temperature, thereby forming address electrodes 10.

Then, dielectric paste is coated on rear glass substrate 8, on which address electrodes 10 are formed, so as to cover address electrodes 10 using a die coating method, for example, thereby forming a dielectric paste layer. Thereafter, base dielectric layer 9 is formed by baking the dielectric paste layer. In addition, the dielectric paste is a coating material containing a dielectric material such as glass powder, a binder, and a solvent.

Then, a barrier rib material layer is formed by coating barrier ribs forming paste containing a barrier rib material on base dielectric layer 9 and patterning the barrier ribs forming paste in a predetermined shape, and then barrier ribs 11 are formed by baking the patterned barrier ribs. Here, a photolithographic method or a sandblasting method can be used as a method of patterning the paste for barrier ribs coated on base dielectric layer 9.

Then, on rear glass substrate 8 on which barrier ribs 11 are formed, phosphor paste containing a phosphor material is coated on base dielectric layer 9 between adjacent barrier ribs 11 and side surfaces of barrier ribs 11 and then the coated phosphor paste is baked, thereby forming phosphor layers 12R, 12G, and 12B. Through the process described above, rear plate 23 having the predetermined components on rear glass substrate 8 is completed. In addition, a material containing lead is not used for each of the constituent components of rear plate 23 described above, in the same manner as front plate 22.

Then, assembly is completed by disposing an electrode forming surface of front plate 22 and an electrode forming surface of rear plate 23 opposite to each other and airtight sealing the peripheries of front plate 22 and rear plate 23 and the exhaust pipe with sealant.

In the assembled PDP, electrical discharge occurs by selectively applying a video signal voltage to a display electrode and ultraviolet rays generated by the discharge excite each color phosphor layer to emit red, green, and blue colored light, and thus color image display is realized.

Figure 2A:
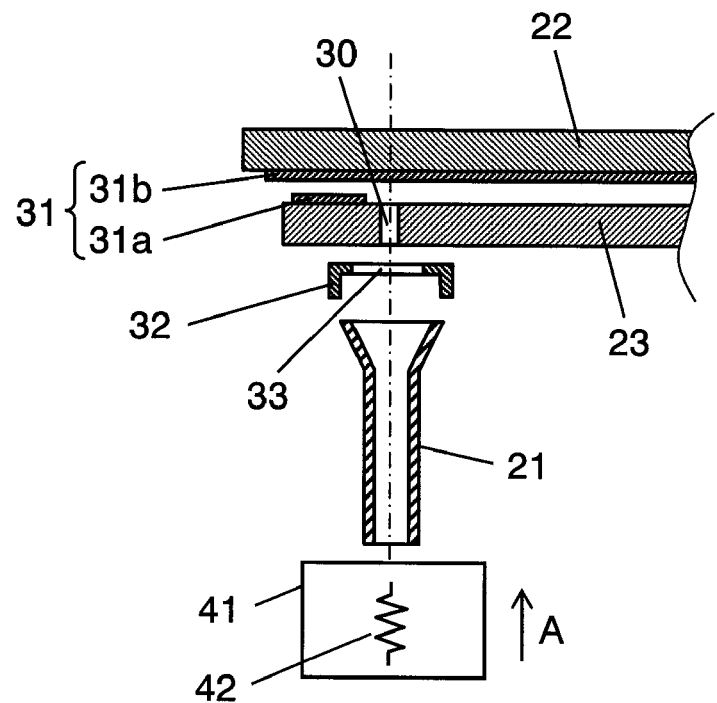
FIG. 2A is a cross-sectional view illustrating a front plate, a rear plate, and an exhaust pipe before sealing in the PDP according to the embodiment of the invention.
Figure 2B:
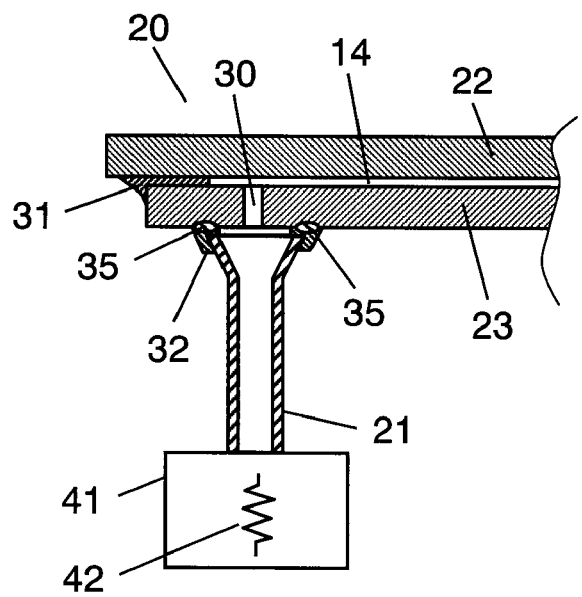
FIG. 2B is a cross-sectional view illustrating a front plate, a rear plate, and an exhaust pipe after sealing in the PDP according to the embodiment of the invention.

Here, procedures in a sealing process in which airtight sealing is performed using sealant will be described. FIG. 2A is a cross-sectional view illustrating a front plate, a rear plate, and an exhaust pipe before sealing in the PDP according to the embodiment of the invention, and FIG. 2B is a cross-sectional view illustrating a front plate, a rear plate, and an exhaust pipe after sealing in the PDP according to the embodiment of the invention.

As shown in FIG. 2A, sealant 31a and 31b are coated at predetermined positions of peripheries of front plate 22 and rear plate 23 using thick film printing or a coating apparatus having an ink jet or a dispenser. Then, display electrodes 4 of front plate 22 and address electrodes 10 of rear plate 23 are aligned to be perpendicular to each other at predetermined positions and then front plate 22 and rear plate 23 are pressed by a fixture (not shown) to be fixed.

Figure 3:
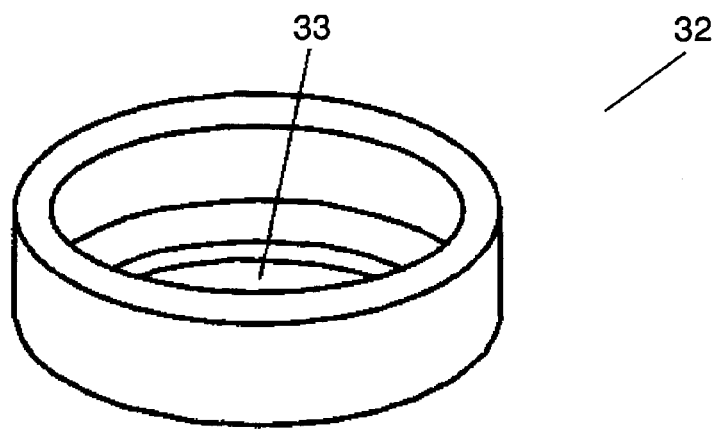
FIG. 3 is a perspective view illustrating the shape of a tablet used to manufacture the PDP according to the embodiment of the invention.

Tablet 32 shown in FIG. 3 is used in the sealing process of sealing exhaust pipe 21 of PDP 20. FIG. 3 is a perspective view illustrating the shape of a tablet used to manufacture the PDP according to the embodiment of the invention.

Then, a center of fine hole 30 for ventilation provided at the predetermined position of a corner portion of rear plate 23 and a center of hole 33 of a central portion of tablet 32 are matched with each other. In addition, assembly is performed by making an alignment such that a center of an opening located at an end of exhaust pipe 21 approximate matches the center of fine hole 30 for ventilation, and exhaust pipe 21 is fixed by pressing with another fixture (not shown) such that the centers do not shift.

In the method of manufacturing PDP 20 according to the embodiment of the invention, the sealing process is performed in the disposition in which a sealed end of exhaust pipe 21 is positioned upward and an end of exhaust pipe 21 connected to an exhaust apparatus is positioned downward. With the disposition described above, connection between the exhaust apparatus and exhaust pipe 21 becomes easy and it is possible to make the pipe arrangement short due to direct connection. As a result, the number of processes is expected to be reduced.

Then, after fixing front plate 22, rear plate 23, and exhaust pipe 21 with a fixture, a lower end of exhaust pipe 21 connected to the exhaust apparatus is connected to exhaust pipe head 41. Exhaust pipe head 41 includes elastic unit 42, such as a spring, and may give a pressure to exhaust pipe 21 in the direction indicated by a narrow A of FIG. 2A. In addition, front plate 22, rear plate 23, and exhaust pipe 21 that are fixed are disposed within a baking oven and temporary baking of sealant 31a and 31b and tablet 32 is performed at predetermined temperature lower than the temperature at which sealing processing for sealant 31a and 31b is performed.

Then, the temperature increases up to the sealing temperature higher than the temperature in temporary baking in order to melt sealant 31a and 31b, which is provided along the peripheries of front plate 22 and rear plate 23, and tablet 32, which is provided on a side of exhaust pipe 21 facing rear plate 23, and then sealant 31a and 31b and tablet 32 are cooled to be solidified, and thus the sealing is performed. FIG. 2B is a view schematically illustrating a state in which the peripheries of front plate 22 and rear plate 23 and the side of exhaust pipe 21 facing rear plate 23 are sealed at sealed parts 35.

Next, sealant 31 and tablet 32 used in the sealing process will be described. Sealant 31 has the shape of paste obtained by mixing amorphous frit glass, which does not contain a low-melting-point lead component, with predetermined filler and then kneading the mixed thing with an organic solvent. Here, the frit glass has a borosilicate based component containing bismuth oxide ($Bi_2O_3$).

In addition, the filler has a thermal resistance and is used to adjust the coefficient of thermal expansion of sealant 31 and to control the flowing state of glass. In particular, for example, cordierite, forsterite, beta-eucryptite, zircon, mullite, barium titanate, aluminum titanate, titanium oxide, molybdenum oxide, tin oxide, aluminum oxide, quartz glass, and the like are preferably used in the single form or mixed form in many cases.

For tablet 32 that is sealant, the paste obtained by mixing the frit glass and the filler and kneading the mixed thing with the solvent is formed in the shape having hole 33 on the central portion using a die. Then, the paste is heated and baked at the temperature necessary to evaporate the solvent and is then sintered and solidified. Furthermore, as filler used for tablet 32, the same material as the filler of sealant 31 can be used.

In addition, a sealing sheet formed by causing a sheet-shaped base material to have viscosity in the predetermined thickness and shape may be attached on a front plate and a rear plate and then be assembled to be sealed, without coating sealant 31 in the sealing process.

Next, a method of sealing exhaust pipe 21 will be described.

Figure 4A:
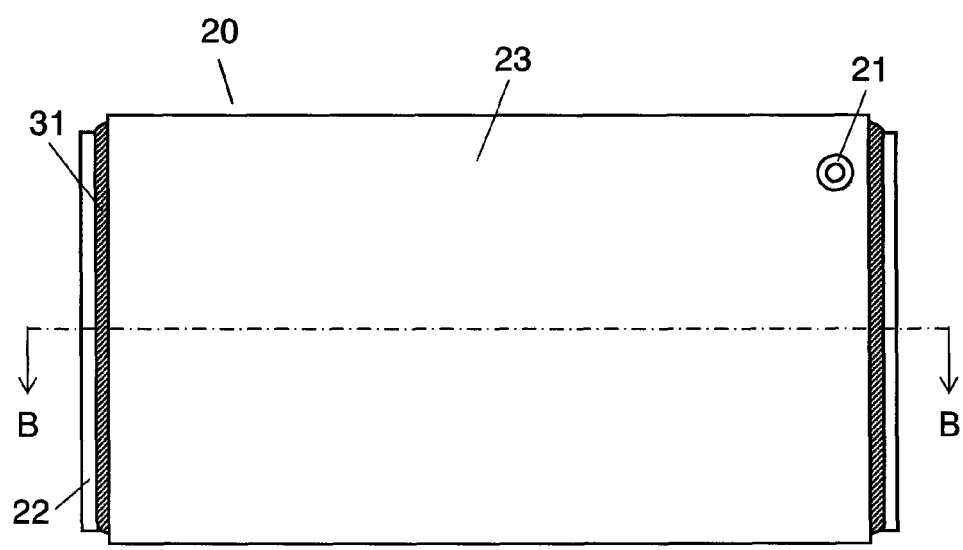
FIG. 4A is a plan view illustrating a state in which a front plate and a rear plate of the PDP according to the embodiment of the invention are attached by sealing.
Figure 4B:
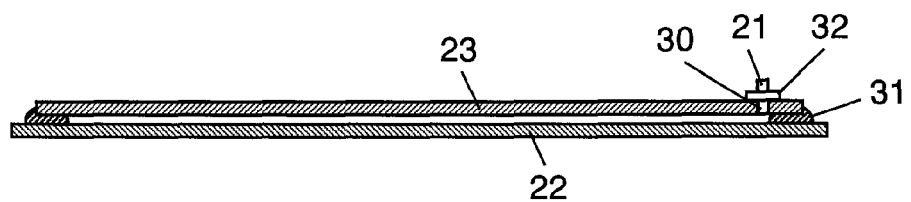
FIG. 4B is a cross-sectional view taken along the line B-B of FIG. 4A.

FIG. 4A is a plan view illustrating a state in which the front plate and the rear plate of the PDP according to the embodiment of the invention are attached by sealing, and FIG. 4B is a cross-sectional view taken along the line B-B of FIG. 4A. In PDP 20, front plate 22 and rear plate 23 are disposed opposite to each other and the peripheries of front plate 22 and rear plate 23 are sealed by sealant 31. In addition, rear plate 23 is provided with exhaust pipe 21 that is sealed by tablet 32. In addition, exhaust pipe 21 is fused and sealed by locally heating and melting (chipping off) a proper place thereof.

Here, a gas burner, an electric heater, and the like are used for the sealing of exhaust pipe 21. A method of using the electric heater is advantageous in that control of heating temperature is relatively correct, handling at the time of mass production is easy, and automation is easy. However, in the case of the method of using the electric heater, a heating part is large due to the electric heater as compared with a method of using a gas burner and time required for heating and cooling is long. Accordingly, it is not easy to increase the manufacturing tact. For this reason, it is general that a method of performing heating and melting by using a gas burner is often used.

Next, a glass material used in the embodiment of the invention will be described in more detail. Non-lead high-distortion-point glass PP-8 (product name of Nippon Electric Glass Co., Ltd.) is used for front plate 22, front glass substrate 1 that is substrate glass of rear plate 23, and rear glass substrate 8 in PDP 20. Moreover, leadless and borosilicate based glass tube FE-2 (product name of Nippon Electric Glass Co., Ltd.) is used for exhaust pipe 21.

Figure 5A:
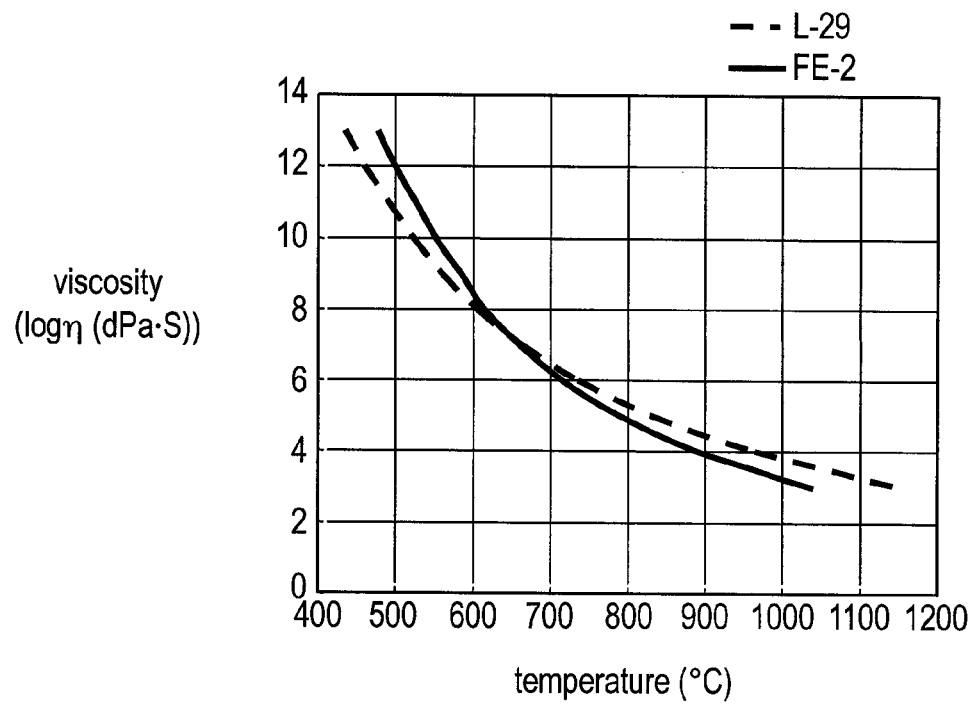
FIG. 5A is a characteristic view illustrating viscosity and temperature of a glass tube of the PDP according to the embodiment of the invention.
Figure 5B:
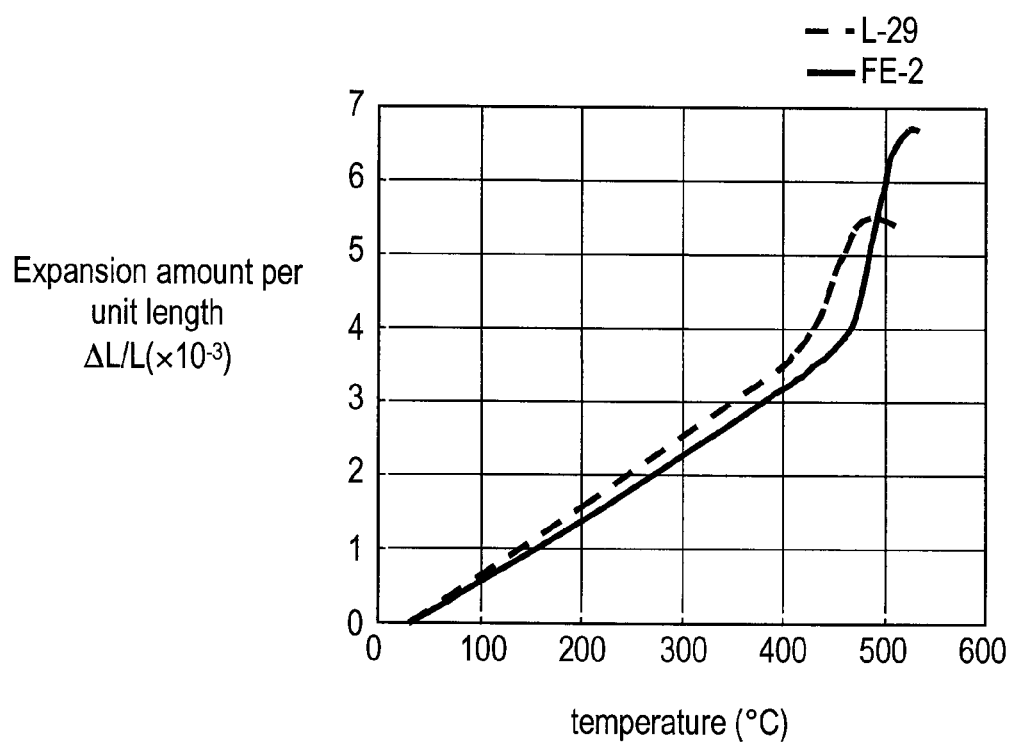
FIG. 5B is a characteristic view illustrating temperature and expansion amount per unit length of the glass tube for exhaust pipe of the same PDP.

Various kinds of characteristics of PP-8 and FE-2 are collectively shown in Table 1. In addition, for the purpose of comparison, the characteristics of the potash glass based glass tube L-29 (product name of Nippon Electric Glass Co., Ltd.), which contains lead, for exhaust pipe 21 is also shown in Table 1. Furthermore, the characteristics of L-29 are illustrated in FIG. 5 for the purpose of comparison with the glass tube FE-2 for exhaust pipes. FIG. 5A is a characteristic view illustrating viscosity and temperature of a glass tube of the PDP according to the embodiment of the invention, and FIG. 5B is a characteristic view illustrating temperature and expansion amount per unit length of the glass tube for exhaust pipe of the same PDP.

[Table 1]

Moreover, IWF BNL189P-200 (product name of Asahi Techno Glass Corp.; hereinafter, simply referred to as 'BNL189P'), which is non-lead frit glass containing bismuth oxide ($Bi_2O_3$) is used as sealant 31. The composition of BNL189P is configured to include 70% to 75% by weight of bismuth oxide ($Bi_2O_3$), 8% to 10% by weight of zinc oxide (ZnO), 4% to 6% by weight of boron oxide ($B_2O_3$), 6% to 8% by weight of aluminum oxide ($Al_2O_3$), 1% to 3% by weight of silicon oxide ($SiO_2$), and 1% to 3% by weight of magnesium oxide (MgO).

In particular, in the case when the amount of bismuth oxide ($Bi_2O_3$) is two small, the softening point temperature of glass does not easily fall, such that sealing is not performed well. In contrast, in the case when the amount of bismuth oxide ($Bi_2O_3$) is two large, reaction with silver (Ag) contained in display electrodes 4 or address electrodes 10 occurs, such that bubbles are easily generated. Therefore, although the amount of bismuth oxide ($Bi_2O_3$) is set to 70% to 75% by weight, it is preferable to set the amount of bismuth oxide ($Bi_2O_3$) within a range 65% to 80% by weight. In addition, the glass softening point temperature of BNL189P is lower than 440° C. and is the desirable temperature.

Further, IWF BNL188P-200 (product name of Asahi Techno Glass Corp.; hereinafter, simply referred to as 'BNL188P'), which is non-lead frit glass containing bismuth oxide ($Bi_2O_3$) is used for tablet 32 that is used to sealing rear plate 23 and exhaust pipe 21. Here, the composition of BNL188P is almost the same as that of BNL189P. In addition, BNL188P is amorphous frit glass not containing lead, and the glass softening point temperature of the BNL188P is lower than 450° C. and is the desirable temperature. In the case of the amorphous frit glass, temperature control thereof is easy as compared with crystallized frit glass and it is also easy to match thermal expansion.

Various characteristics of BNL189P, BNL188P, and GA-0963/200M (product name of Nippon Electric Glass Co., Ltd.; hereinafter, simply referred to as 'GA-0963') that is known amorphous and high-softening-point frit glass containing lead are summarized in Table 2.

[Table 2]

Paying attention to coefficients of thermal expansion among various kinds of characteristic data shown in Table 1, Table 2, and FIG. 5, the coefficients of thermal expansion of three types of frit glass are almost the same level from data in Table 2. Although the coefficient of thermal expansion of non-lead glass tube FE-2 for exhaust pipes is almost equal to that of the substrate glass PP-8, only the coefficient of thermal expansion of the glass tube L-29 for exhaust pipes containing lead shows a large value compared with other materials.

Figure 6:
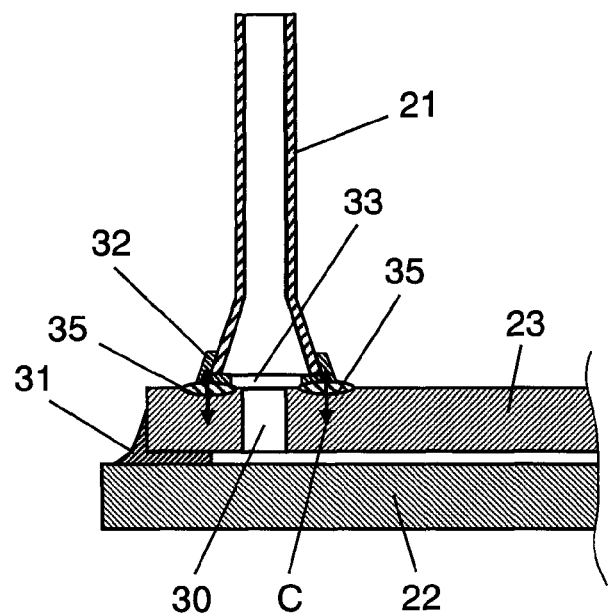
FIG. 6 is a cross-sectional view illustrating a sealed part of an exhaust pipe of the PDP according to the embodiment of the invention.
Figure 7:
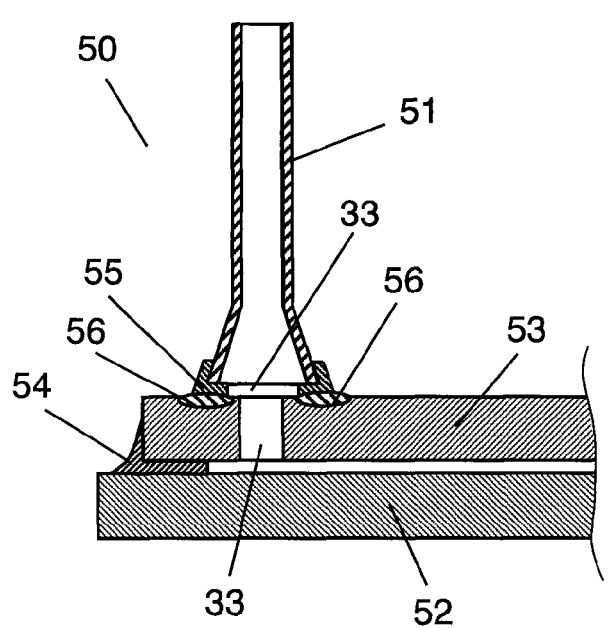
FIG. 7 is a cross-sectional view illustrating the periphery of an exhaust pipe in a known PDP.

It will be described about a result when performing sealing using sealant 31 and tablet 32. FIG. 6 is a cross-sectional view illustrating a sealed part of an exhaust pipe of the PDP according to the embodiment of the invention.

As shown in FIG. 6, in sealed part 35 where rear plate 23; exhaust pipe 21, and sealing tablet 32 are associated with each other, a stress occurring due to a difference among the coefficients of thermal expansion of materials of rear plate 23, exhaust pipe 21, and sealing tablet 32 is a tensile stress (tension) in the direction toward the outside, which is indicated by arrow C.

In PDP 20, a non-lead material is used for rear glass substrate 8 of rear plate 23, a glass tube for exhaust pipe 21, and frit glass for tablet 32 for sealing rear glass substrate 8 of rear plate 23 and the glass tube for exhaust pipe 21. In addition, since the coefficients of thermal expansion of the substrate glass PP-8 and non-lead glass tube FE-2 are values very close to each other, it is determined whether a force working on sealed part 35 is to be a tensile stress or a compressive stress according to the coefficient of thermal expansion of the frit glass.

Here, data numeric analysis was performed using the PP-8, of which a coefficient of thermal expansion α is $83 \times 10^{-7}$/° C., of rear glass substrate 8 for rear plate 23 and the non-lead glass tube FE-2, of which a coefficient of thermal expansion α is $85 \times 10^{-7}$/° C., of exhaust pipe 21. As a result, it could be seen that a boundary value of the coefficient of thermal expansion of the frit glass for sealing rear plates 23 and exhaust pipe 21 was $\alpha=70\times10^{-7}/°$ C. That is, it could be seen that a compressive stress occurred in the frit glass having a coefficient of thermal expansion larger than the boundary value, and a tensile stress occurred in the frit glass having a coefficient of thermal expansion smaller than the boundary value. Therefore, the coefficient of thermal expansion $\alpha=(67\pm2)\times10^{-7}/°$ C. of BNL188P corresponds to the tensile stress. In actuality, a thermal shock test on a sealed part between rear plate 23 and exhaust pipe 21 of PDP 20 according to the embodiment of the invention was repeatedly performed; however, there occurred no trouble, such as crack or leak, in the sealed part.

As described above, leadless and borosilicate based amorphous frit glass containing bismuth oxide ($Bi_2O_3$) is used as the frit glass of tablet 32 for sealing rear plate 23 and exhaust pipe 21 of PDP 20. Moreover, since an adjustment is made such that the tensile stress (tension) works on the sealed part, the sealed part is not damaged by cracking or the airtight state of the sealed part does not deteriorate, and thus the high reliability is secured. As a result, it is possible to realize a high-quality PDP in which an environmental issue is considered.

Strictly speaking, leadless and borosilicate based frit glass containing bismuth oxide ($Bi_2O_3$), which is used in the method of manufacturing the PDP according to the embodiment of the invention, does not necessarily contain lead. An analysis shows detection of an extremely small amount of lead even though the amount of lead is 500 PPM or less. However, according to the specifications of EC-RoHS instruction concerning the environment in Europe, it can be considered that lead is not contained if the amount of lead is 1000 PPM or less. Accordingly, in the embodiment of the invention, the expression, such as 'not containing lead' or 'non-lead' is used.

INDUSTRIAL APPLICABILITY

According to the invention, since a sealed part is not damaged by cracking or the airtight state of the sealed part does not deteriorate, the high reliability is secured. As a result, the invention is greatly advantageous when realizing a high-quality PDP, in which an environmental issue is considered, and applying the PDP to a large-screen display device or the like.

TABLE 1

| Items(unit) | FE-2 (Non-lead exhaust pipe) | L-29 (Exhaust pipe containing lead) | PP-8 (Substrate glass) |
|---|---|---|---|
| Coefficient of thermal expansion($\times10^{-7}/°$ C.) | 85 | 94 | 83 |
| Distortion point(° C.) | 445 | 395 | 582 |
| Slow cooling point(° C.) | 480 | 435 | 626 |
| Softening point(° C.) | 630 | 625 | 836 |
| Working temperature(° C.) | 890 | 965 | — |
| Density(g/cm³) | 2.46 | 3.05 | 2.82 |

TABLE 2

| Characteristic items | (Lead) high-softening-point frit GA-0963/200M | Non-lead frit IWF BNL189P-200 | Raw material of non-lead tablet IWF BNL188P-200 |
|---|---|---|---|
| Density | 6.4 g/cm³ | 6.0 g/cm³ | 6.0 g/cm³ |
| Transition point | 365 ± 7° C. | 358 ± 5° C. | 364 ± 5° C. |
| Softening point | 440 + 10/−5° C. | 430 ± 5° C. | 439 ± 5° C. |
| Yield point | 395 ± 7° C. | 408 ± 10° C. | 412 ± 10° C. |
| Coefficient of thermal expansion | 67.3 ± 1.5 × $10^{-7}/°$ C. | 67.0 ± 2.0 × $10^{-7}/°$ C. | 67.0 ± 2.0 × $10^{-7}/°$ C. |

The invention claimed is:

1. A plasma display panel comprising:
a front plate;
a rear plate opposite to the front plate; and
a tubular exhaust pipe,
wherein an end of the tubular exhaust pipe is disposed in the vicinity of a fine hole formed in the rear plate, the rear plate and the tubular exhaust pipe are sealed by a sealed part by melting a tablet comprising a first amorphous frit glass not containing lead,
peripheries of the front plate and the rear plate and the exhaust pipe are sealed with a sealant comprising frit glass in order to form a discharge space,
the discharge space is ventilated and discharge gas is filled into the discharge space through the exhaust pipe, and
the first amorphous frit glass comprising a material that cooperates with a material of the rear plate and a material of the tubular exhaust pipe to make a stress working on the sealed part such that a tension exists in the direction of the rear plate and the direction of the exhaust pipe.

2. The plasma display panel of claim 1, wherein the exhaust pipe is formed of a material not containing lead.

3. The plasma display panel of claim 2, wherein a rear glass substrate having a coefficient of thermal expansion a of $83\times10^{-7}/°$ C. is used for the rear plate, a borosilicate based glass tube having a coefficient of thermal expansion a of $85\times10^{-7}/°$ C. is used for the exhaust pipe, and borosilicate based frit glass having a coefficient of thermal expansion a smaller than $70\times10^{-7}/°$ C. and equal to or larger than $65\times10^{-7}/°$ C. is used for the tablet.

4. The plasma display panel of claim 1, wherein the sealant comprises a second amorphous frit glass not containing lead and a filler, the second amorphous frit glass comprising a borosilicate based component and a bismuth oxide, the filler comprising at least one selected from the group consisting of cordierite, forsterite, beta-eucryptite, zircon, mullite, barium titanate, aluminum titanate, titanium oxide, molybdenum oxide, tin oxide, aluminum oxide, and quartz glass.

5. The plasma display panel of claim 1, wherein the sealant comprises a bismuth oxide at 65% or more and 80% or less by weight of the sealant.

6. The plasma display panel of claim 1, wherein the sealant comprises a bismuth oxide at 70% or more and 75% or less by weight of the sealant.

7. The plasma display panel of claim 4, wherein a glass softening point temperature of the second amorphous frit glass is lower than 440° C.

8. The plasma display panel of claim 1, wherein the tablet comprises the first amorphous frit glass not containing lead and a filler, the first amorphous frit glass comprising a borosilicate based component and a bismuth oxide, the filler comprising at least one selected from the group consisting of cordierite, forsterite, beta-eucryptite, zircon, mullite, barium titanate, aluminum titanate, titanium oxide, molybdenum oxide, tin oxide, aluminum oxide, and quartz glass.

9. The plasma display panel of claim 8, wherein a glass softening point temperature of the first amorphous frit glass is lower than 450° C.

10. The plasma display panel of claim 1, wherein the composition of the tablet is substantially the same as the composition of the sealant.

11. The plasma display panel of claim 1, wherein the tension is due to a difference between a coefficient of thermal expansion of the material and coefficient of thermal expansion of the rear plate and the thermal exhaust pipe thermal expansion of the rear plate and the thermal exhaust pipe.

* * * * *